United States Patent
King

(10) Patent No.: US 7,093,286 B1
(45) Date of Patent: Aug. 15, 2006

(54) METHOD AND SYSTEM FOR EXCHANGING SENSITIVE INFORMATION IN A WIRELESS COMMUNICATION SYSTEM

(75) Inventor: Peter F. King, Half Moon Bay, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/559,230

(22) Filed: Apr. 26, 2000

Related U.S. Application Data

(60) Provisional application No. 60/145,439, filed on Jul. 23, 1999.

(51) Int. Cl.
*H04L 9/00* (2006.01)
*H04K 1/00* (2006.01)

(52) U.S. Cl. ............... 726/12; 726/1; 726/3; 380/270; 380/271

(58) Field of Classification Search ............... 705/54; 713/201; 726/12
See application file for complete search history.

(56) References Cited

U.S. PATENT DOCUMENTS

| | | | |
|---|---|---|---|
| 5,315,636 A | 5/1994 | Patel | |
| 5,515,424 A | 5/1996 | Kenney | |
| 5,523,761 A * | 6/1996 | Gildea | ............ 342/357.03 |
| 5,528,518 A | 6/1996 | Bradshaw et al. | |
| 5,561,705 A | 10/1996 | Allard et al. | |
| 5,570,412 A | 10/1996 | LeBlanc | |
| 5,696,898 A * | 12/1997 | Baker et al. | ............ 713/201 |
| 5,809,415 A | 9/1998 | Rossmann | |
| 5,812,647 A | 9/1998 | Beaumont et al. | |
| 5,835,130 A | 11/1998 | Read et al. | |
| 5,835,907 A | 11/1998 | Newman | |
| 5,850,594 A | 12/1998 | Cannon et al. | |
| 5,852,783 A | 12/1998 | Tabe et al. | |
| 5,854,825 A | 12/1998 | Mukaihara et al. | |
| 5,943,399 A | 8/1999 | Bannister et al. | |
| 5,950,193 A | 9/1999 | Kulkarni | |
| 6,032,051 A | 2/2000 | Hall et al. | |
| 6,084,951 A | 7/2000 | Smith et al. | |
| 6,141,653 A * | 10/2000 | Conklin et al. | ............ 705/80 |
| 6,154,844 A * | 11/2000 | Touboul et al. | ............ 713/201 |
| 6,175,616 B1 | 1/2001 | Light et al. | |
| 6,185,683 B1 * | 2/2001 | Ginter et al. | ............ 713/176 |
| 6,205,326 B1 | 3/2001 | Tell et al. | |

(Continued)

FOREIGN PATENT DOCUMENTS

EP      0779759 A2     6/1997

(Continued)

OTHER PUBLICATIONS

Winslett et al., "Assuring Security and Privacy for Digital Library Transactions on the Web: Client and Server Security Policies," IEEE International Forum on Research and Technology Advances in Washington, D.C., May 7-9, 1997.*

(Continued)

*Primary Examiner*—Kambiz Zand
(74) *Attorney, Agent, or Firm*—Townsend and Townsend and Crew LLP

(57) ABSTRACT

Improved techniques that enable the exchange of sensitive information between client devices and server devices are disclosed. The exchange, as well as the use and nature, of sensitive information released can be governed by one or more privacy agreements established between the principle parties, namely, a client device and a content server. A proxy server can be used to establish privacy agreements with content servers (service providers).

37 Claims, 11 Drawing Sheets

U.S. PATENT DOCUMENTS

| | | | |
|---|---|---|---|
| 6,260,148 B1 | 7/2001 | Aggarwal et al. | |
| 6,285,364 B1 | 9/2001 | Giordano, III et al. | |
| 6,321,092 B1 | 11/2001 | Fitch et al. | |
| 6,338,050 B1* | 1/2002 | Conklin et al. | 705/80 |
| 6,427,140 B1* | 7/2002 | Ginter et al. | 705/80 |
| 6,459,892 B1 | 10/2002 | Burgan et al. | |
| 6,490,601 B1* | 12/2002 | Markus et al. | 715/507 |
| 6,512,930 B1 | 1/2003 | Sandegren | |
| 6,677,894 B1 | 1/2004 | Sheynblat et al. | |
| 6,714,793 B1 | 3/2004 | Carey et al. | |
| 6,760,742 B1 | 7/2004 | Hoyle | |
| 6,944,600 B1* | 9/2005 | Stefik et al. | 705/57 |

FOREIGN PATENT DOCUMENTS

| | | |
|---|---|---|
| EP | 0874529 A2 | 10/1998 |
| WO | WO9816045 | 4/1998 |
| WO | WO9934628 | 7/1999 |
| WO | WO0051391 | 8/2000 |

OTHER PUBLICATIONS

Askwith et al., "Achieving User Privacy in Mobile Networks," IEEE Proceedings, Annual Computer Security Applications Conference, Dec. 8, 1997.

Hitchings Jr., U.S. Appl. No. 09/270,389, filed Mar. 1999.

"Wireless Application Protocol: Wireless Session Protocol Specification" (WAP WSP), Version 30, Apr. 1998.

UP.Browser™ User Handbook, Unwired Planet, Inc., Nov. 1977.

Marchiori, Reagle and Jaye, "Platform for Privacy Preferences (PSP1.0) Specification," World Wide Web Consortium (W3C) Working Draft (WD-P3P-19981109), Nov. 1998.

W3C Press Release, "W3C Publishes First Public Working Draft Of P3P 1.0," World Wide Web Consortium (W3C), May 1998.

Cranor and Resnick, "Protocols for Automated Negotiations with Buyer Anonymity and Seller Reputations," Jan. 1999.

Reagle and Cranor, "The Platform for Privacy Preferences," W3C Note, NOTE-P3P-CACM-19981106, Nov. 1998.

Jörg Meyer, "How to manage, negotiate and transfer personal information on the Web," Mar. 1999.

Cranor, "P3P Guiding Principles," W3C Note, NOTE-P3P10-principles-19980721, Jul. 1998.

"Working Party on the Protection of Individuals with regard to the processing of Personal Data," European Commission, Directorate General XV Opinion (Opinion Jan. 1998), Jan. 1998.

Cranor, "Internet Privacy: A Public Concern," netWorker: The Craft Of Network Computing (ACM), vol. 2, No. 3, Jun./Jul. 1998.

* cited by examiner

METHOD AND SYSTEM FOR EXCHANGING SENSITIVE INFORMATION IN A WIRELESS COMMUNICATION SYSTEM

CROSS-REFERENCE TO RELATED APPLICATIONS

This application claims the benefit of U.S. Provisional Application No. 60/145,439, filed Jul. 23, 1999, and entitled "LOCATION ARCHITECTURE FOR A WIRELESS COMMUNICATIONS SYSTEM", the content of which is hereby incorporated by reference. This application is also related to U.S. patent application Ser. No. 09/270,389, filed Mar. 16, 1999, and entitled "METHOD AND SYSTEM FOR UTILIZING SUBSCRIBER STATUS AND LOCATION INFORMATION IN A WIRELESS NETWORK", the content of which is hereby incorporated by reference.

BACKGROUND OF THE INVENTION

1. Field of the Invention

The present invention relates to wireless communication systems and, more particularly, to a method and system for providing controlled use of sensitive information for wireless client devices of wireless communication systems.

2. Description of the Related Art

Writing in 1948, George Orwell envisioned a world where Big Brother exercises complete control over its citizens. Orwell's classic describes a world where Big Brother monitors the everyday conduct of its citizens through technologically advanced equipment. In today's technologically advanced society Big Brother is Big Business and Big Business wants information about consumers to improve the production, quality, marketing and distribution of their goods and services. Wireless client devices (e.g. cellular phones, pagers and personal digital assistants (PDAs)) represent one currently popular technologically advanced piece of equipment. Service providers that administer the networks that service these wireless client devices have a considerable amount of personal information about their subscribers. The known personal information can, for example, include identification information, credit information, contact information (i.e. what numbers you are calling) and location information gathered by the wireless client devices and the networks associated with the wireless client devices.

The subscribers through their subscriptions to the various wireless services have granted their permission for the service providers to be in possession of some of their personal information (e.g., name, account number, location). If the service providers release this information to third parties without the permission of the subscribers it might be viewed as an unauthorized and, perhaps, unlawful disclosure of private information of their subscribers.

One valuable piece of information in the possession of the wireless network service providers is subscriber location information. Location information for a wireless client device (e.g., cellular telephone, pager, personal digital assistant (PDA)) can often be obtained directly from the wireless client device or from the network servicing the wireless client device (e.g. GPS, Time Difference of Arrival (TDOA)). Location information has considerable value to businesses because it allows them to more efficiently deploy their products and services in a fashion that reduces operating costs and maximizes profits. This information represents an attractive untapped source of revenue for the wireless network service providers. One problem with tapping this source of revenue is that it raises privacy concerns with regard to the subscriber. Another problem is that service providers want to provide the location information but, in so doing, do not want to expose their confidential network topology information.

Location information can also be of considerable practical value to subscribers in a variety of situations. Emergency service providers (e.g., Police and EMT's) already use location information from wireless client device to locate callers in need of emergency assistance. Location information could also be of value to subscribers with less urgent concerns. For example, a subscriber with an incapacitated automobile in a remote location would be helped if the location information from his/her wireless client device (e.g., cell phone) could be passed on to an automobile towing service. A parent unsure of where to pick up his/her child could obtain location information from a wireless client device in the possession of the child.

Thus, there is a need for establishing ways to control the dissemination of private information, such as location information, of subscribers to wireless network services.

SUMMARY OF THE INVENTION

Broadly speaking, the invention relates to improved techniques that enable the exchange of sensitive information between client devices and server devices. The exchange, as well as the use and nature, of sensitive information released can be governed by one or more privacy agreements established between the principle parties, namely, a client device and a content server. A proxy server can be used to establish privacy agreements with content servers (service providers) in at least two ways. A first way is through configuration of client devices in which a proxy server can manage a list of realms (e.g., URLs) that are allowed sensitive information (e.g., location reporting). A second way is through negotiation in which the proxy server acts as a proxy for agreement negotiation. In one implementation, the agreement negotiation can be in accordance with Platform for Privacy Preferences (P3P) (See www.w3.org). The invention is particularly well suited for wireless communication systems that support wireless client devices.

The invention can be implemented in numerous ways including, as a method, an apparatus, a computer readable medium, and a computer system. Several embodiments of the invention are discussed below.

As a method for controlling exchange of private information associated with a client device, one embodiment of the invention includes the operations of: receiving a request from the client device; determining whether a privacy agreement is needed to respond to the request; negotiating a privacy agreement that governs the exchange of the private information when a privacy agreement is needed; and thereafter producing a response to the request.

As a method for exchanging private information associated with a client device to a server device via a proxy server, one embodiment of the invention includes the operations of: establishing an authorization agreement that enables the proxy server to negotiate privacy agreements with server devices on behalf of the client device; receiving a request at the proxy server; receiving a proposed privacy agreement from the server device associated with the request; accepting the proposed privacy agreement as a privacy agreement by the proxy server for the client device when in accord with the authorization agreement; and providing the private information to the server device after establishment of the privacy agreement.

As a method for controlling exchange of private information associated with a client device supported by a carrier network infrastructure, one embodiment of the invention includes the operations of: receiving a request from the client device, the request being directed to a server device; determining whether a privacy agreement is needed to respond to the request; determining whether the server device is authorized to receive the private information associated with the client device when it is determined that a privacy agreement is needed; and providing the private information to the server device associated with the request when it is determined that the server device is authorized to receive the private information associated with the client device.

As a system for controlling information exchange between a wireless client device and server devices, the wireless client device being supported by a wireless network, one embodiment comprises a proxy server device operatively connected between the wireless client device and the server device. The proxy server device manages distribution of private information associated with the wireless client device to the server devices. The proxy server device includes at least a storage area and a privacy manager. The storage area stores information received from at least one of the wireless client devices and from the wireless network. The privacy manager operates to restrict the release of the information received from the wireless client device and the wireless network to the one or more of the server devices unless a suitable privacy agreement governing the use of the information is in place for the one or more server devices.

As a computer readable medium including computer program code for controlling exchange of private information associated with a client device, one embodiment of said computer readable medium includes at least: computer program code for receiving a request from the client device; and computer program code for negotiating a privacy agreement that governs the exchange of the private information.

As a computer readable medium including computer program code for exchanging private information associated with a client device to a server device via a proxy server, one embodiment of said computer readable medium includes at least: computer program code for establishing an authorization agreement that enables the proxy server to negotiate privacy agreements with server devices on behalf of the client device; computer program code for receiving a request at the proxy server; computer program code for receiving a proposed privacy agreement from the server device associated with the request; computer program code for accepting the proposed privacy agreement as a privacy agreement by the proxy server for the client device when in accord with the authorization agreement; and computer program code for providing the private information to the server device after establishment of the privacy agreement.

As a computer readable medium including computer program code for controlling exchange of private information associated with a client device supported by a carrier network infrastructure, one embodiment of said computer readable medium includes at least: computer program code for receiving a request from the client device, the request being directed to a server device; computer program code for determining whether the server device is authorized to receive the private information associated with the client device; and computer program code for providing the private information to the server device associated with the request when said determining determines whether the server device is authorized to receive the private information associated with the client device determines that the server device is authorized to receive the private information associated with the client device.

The advantages of the invention are numerous. Different embodiments or implementations may yield one or more of the following advantages. One advantage of the invention is that subscribers to networks (e.g., wireless networks) can control the release of their information over the networks. Another advantage of the invention is that client devices (subscribers) of networks can control the release of their information with respect to server devices on the networks. Still another advantage of the invention is that a proxy server can negotiate privacy agreements on behalf of client devices. Yet another advantage of the invention is that a proxy server can transform various location data formats without exposing confidential network topology information. Yet still another advantage of the invention is that the proxy server can add sensitive information it otherwise has access to (e.g., subscriber data) based on privacy agreements that are under control of client devices (or end users)

Other aspects and advantages of the invention will become apparent from the following detailed description taken in conjunction with the accompanying drawings, which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
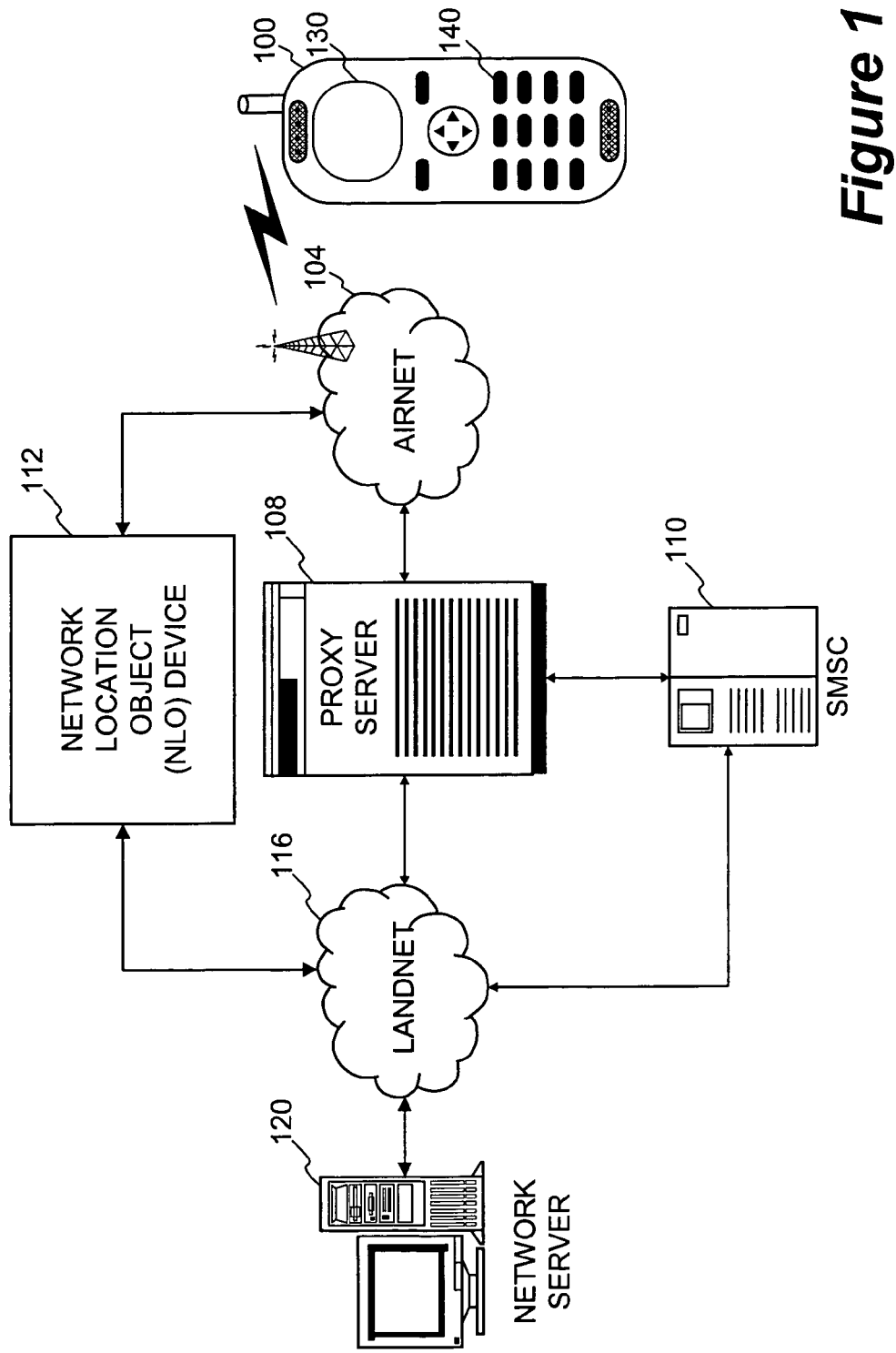
FIG. 1 is a block diagram of a communications system according to an embodiment of the invention.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry have not been described in detail to avoid unnecessarily obscuring aspects of the present invention.

The invention relates to improved techniques that enable the exchange of sensitive information between client devices and server devices. The exchange, as well as the use and nature, of sensitive information released can be governed by one or more privacy agreements established between the principle parties, namely, a client device and a content server. A proxy server can be used to establish privacy agreements with content servers (service providers) in at least two ways. A first way is through configuration of client devices in which a proxy server can manage a list of realms (e.g., URLs) that are allowed sensitive information (e.g., location reporting). A second way is through negotiation in which the proxy server acts as a proxy for agreement negotiation. In one implementation, the agreement negotiation can be in accordance with P3P.

The invention pertains to techniques that enable privacy agreements to be established between wireless client devices (e.g., cellular telephones, pagers, personal digital assistants, vehicle navigation systems, telematics devices, etc.) and server devices, connected via a proxy server device which acts as a trusted third party. Once a privacy agreement is established between a wireless client device and a server device, the server device is able to obtain and utilize certain private (or sensitive) information from the wireless client device or the proxy server device therefor. Although the private (or sensitive) information can include a wide range of information, the discussion below focuses on location information. Additionally, the form of the location information may be presented in many different formats (e.g., latitude and longitude, map coordinates, particular address, etc.).

A wireless client device may pass location information to a proxy server device each time it makes a request. The proxy server device may also receives location information on the wireless client device from the wireless network associated with the wireless client device. The proxy server device, upon receiving both sets of information, may perform canonicalization and reconciliation processes on the two groups of information. The canonicalized and reconciled location information is only released by the proxy server device to a remote service device after a privacy agreement has been established. For example, location information relating to a particular wireless client device will not be released to a remote server device unless or until a privacy agreement is in place between the particular wireless client device and the remote server device.

Wireless client devices, also referred to as mobile devices or two-way interactive communication devices, include but are not limited to cellular telephones, personal digital assistant (PDA) like devices, two-way paging devices, wireless capable remote controllers, vehicle navigation systems or telematics devices. These devices typically have considerably less processing and memory resources than are found on desktop and laptop personal computers. The wireless client devices, which are not a combination of a personal computer and a wireless communication module, have a small display screen and a compact user interface for interactions with server devices.

FIG. 1 is a block diagram of an information retrieval system according to one embodiment of the invention. Landnet 116 is a landline network that may be the Internet, an Intranet or a data network of other private networks. More generally, the landnet 116 is a wired network. Coupled to landnet 116 is a server device 120. As an example, the server device 120 may be a workstation computer such as is available from SUN Microsystems Inc. (www.sun.com). The information stored by the server device 120 may be hypermedia information. Additionally, the server device 120 may also have a firewall.

Airnet 104 is a wireless communications network. Further, it will be appreciated that the airnet can use a wide variety of wireless networks, examples of which include Cellular Digital Packet Data (CDPD), Global System for Mobile Communications (GSM), Code Division Multiple Access (CDMA) and Time Division Multiple Access (TDMA), to name a few. More generally, the airnet 104 is a wireless network.

Serviced by airnet 104 are a plurality of wireless client devices 100, also referred to as two-way interactive communication devices, though only one such device is shown in FIG. 1. Wireless client device 100 is capable of communicating wirelessly with a wireless carrier infrastructure that generally comprises a base station and an operations and maintenance center associated with airnet 104. The base station controls radio or telecommunication links with mobile devices, including two-way wireless interactive communication devices. The operations and maintenance center can include a mobile switching center that performs the switching of calls between the mobile devices and other fixed or mobile network users. Further, the operations and maintenance center can manage mobile services, such as authentication, and oversees the proper operation and setup of the wireless network. Wireless network location information, also referred to as Network Location Objects (NLOs), relating to each of the managed wireless client devices can be determined by a NLO device 112 which is accessible via airnet 104 or landnet 116.

Between airnet 104 and landnet 116 is a proxy server device 108 functioning as a network gateway server. The proxy server device 108 may, for example, be a workstation or a personal computer. The communication protocol in airnet 104 is often different from that in landnet 100. Hence, one of the functions that proxy server device 108 may perform is to map or translate one communication protocol to another, thereby wireless client device 100 coupled to airnet 104 can communicate with any of the server devices coupled to landnet 116 via proxy server device 108. The proxy server device 108 may also provide for subscriber account storage and management, configuration services, and location information determination and/or storage. Further, the proxy server device 108 can provide for the management, negotiation and storage of privacy agreements.

There are various ways to provide the location information (or sensitive information) to the content server. In the principal approach discussed below, the client device sends its location with some or all of its requests to content servers. Typically, the requests will be directed first to a proxy server which controls the release of the location information to the content server on behalf of the client device. According to other approaches, the proxy server can ask the client device for the location information (or other sensitive information). These other approaches can, for example, be implemented by (1) propagating an error back to the client device that requests the location information (e.g., P3P), (2) returning trusted executable content that requests the location information (e.g., MMP), or (3) triggering a separate client/server location determining protocol (see, e.g., www.snaptrack.com).

According to the principal approach, proxy server device 108 receives a Handset Location Object (HLO) from wireless client device 100 when a request is sent from wireless client device 100 to proxy server device 108. The Handset Location Object (HLO) is the location of wireless client device 100 (handset) as determined by wireless client device 100. At periodic intervals or when requested, proxy server device 108 receives a Network Location Object (NLO). The Network Location Object (NLO) is the location of wireless client device 100 as determined by the network (e.g., airnet 104). These locations or positions may be determined by GPS, Time Distance of Arrival or similar locating systems, which are well known in the art. Proxy server device 108 processes the Handset Location Object (HLO) and the Network Location Object (NLO) and generates an Absolute Location Object (ALO) which represents a reconciliation of the NLO and HLO. Alternatively, a separate network element can receive the HLO and NLO and then generate the ALO.

When the dissemination of location information for wireless client devices is involved, the information retrieval system works as follows. Wireless client device 100 forwards a request via proxy server device 108. Proxy server device 108 forwards the request to server device 120. Typically, server device 120 is identified by a Uniform Resource Identifier (URI) or some similar identifier. Server device 120 then requests location and perhaps other private information (e.g., name, phone number, demographic information, etc.). Alternatively, server device 120 may also request location and other private information on wireless client device 100 independent of wireless client device 100 submitting a request. Proxy server device 108 makes a determination as to whether or not there is a previously existing privacy agreement associated with the server device 120 and wireless client device 100. If there is no privacy agreement in place, one must be negotiated and stored prior to the exchange of private information (including location and other information). Proxy server device 108 (or a separate network device) performs a canonicalization (e.g., transformation) process on the HLOs received from wireless client device 100 and NLOs from NLO storage device 112, and then (re)submits the request to the server with the sensitive data attached.

According to one embodiment, the communication protocol used by server device 120 is the well known HyperText Transfer Protocol (HTTP) or a secure version SHTTP, and runs on Transmission Control Protocol (TCP) and controls the connection to proxy server device 108, and the exchange of information therebetween. The communication protocol between wireless client device 100 and proxy server device 108 via airnet 104 is, for example, Handheld Device Transport Protocol (HDTP) (formerly known as Secure Uplink Gateway Protocol (SUGP)), which preferably runs on User Datagram Protocol (UDP) and controls the connection of a Handheld Device Markup Language (HDML) web browser in wireless client device 100, to proxy server device 108. HDML, similar to that of HTML, is a tag based document language and comprises a set of commands or statements that specify how information displayed on a small screen of the wireless client device 100. One skilled in the art will appreciate that the present invention can be practiced using other communications protocols (e.g., Wireless Session Protocol (WSP), Hypertext Transport Protocol (HTTP), Wireless Transport Protocol (WTP), and markup languages (e.g., Compact Hypertext Markup Language (cHTML), Extensible Markup Language (XML) and Wireless Markup Language (WML)).

It should be noted that HDTP is a session-level protocol that resembles HTTP but without incurring the overhead thereof and is highly optimized for use in thin devices, such as mobile devices that have significantly less computing power and memory than a desktop personal computer. Further, it is understood to those skilled in the art that UDP does not require a connection to be established between a client and a server device before information can be exchanged, which eliminates the need of exchanging a large number of packets during a session creation between a client and a server device. Exchanging a very small number of packets during a transaction is a desired feature for a mobile device with very limited computing power and memory to effectively interact with a landline device.

Some of the features in wireless client device 100 that make the disclosed system work more efficiently are described below. According to one embodiment, wireless client device 100 includes a display screen 130 and a phone keypad 140 which allow a user thereof to communicate interactively with wireless client device 100. Phone keypad 140 preferably provides a typical phone keypad, a pair of generic buttons and a set of arrow buttons. Further, it is to be understood by those of ordinary skill in the art that the present invention may be practiced using input interfaces (e.g., softkeys, iconic screens) other than a phone keypad.

Wireless client device 100 includes a working memory where compiled and linked processes of the present invention are typically stored as a client module that causes wireless client device 100 to operate with, for example, proxy server device 108. Upon activation of a predetermined key sequence utilizing phone keypad 140, for example, a microcontroller within wireless client device 100 initiates a communication session request to proxy server device 108 using the client module in the working memory. Upon establishing the communication session, wireless client device 100 typically receives HDML, WML, HTML, XML, xHTML or other content from proxy server device 114 and stores (caches) the content in the working memory.

As used herein, a display screen is the physical display apparatus in a wireless client device, such as a 4-line by 20-character Liquid Crystal Display (LCD) screen. A screen display is an image presented or displayed on the display screen. Further it is understood that a display screen having display lines is only for illustrative purpose and many display screens in reality are graphics-based and do not necessarily have distinct display lines and it will be appreciated that the principles of this invention are equally applicable thereto.

Figure 2:
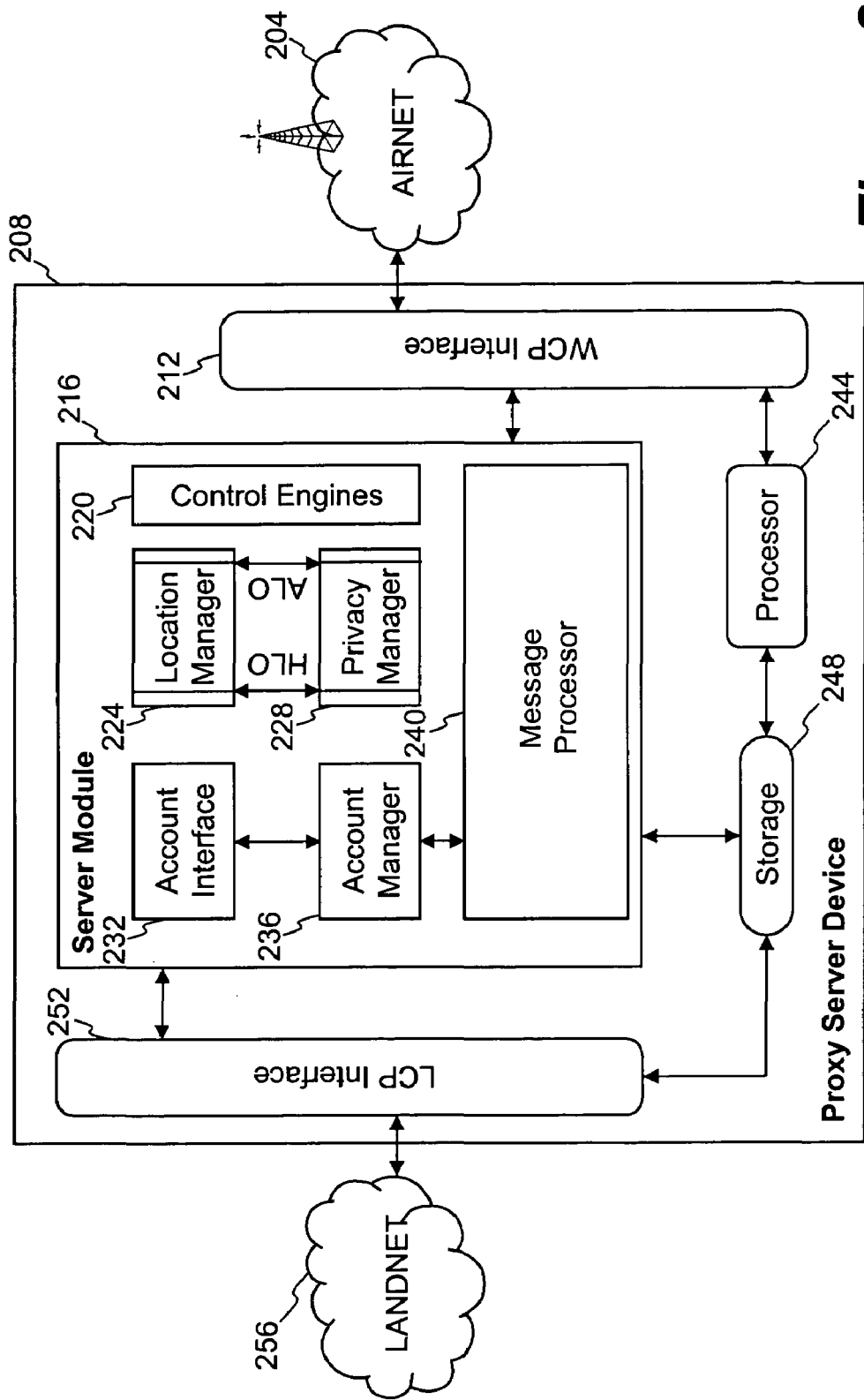
FIG. 2 is a block diagram of a proxy server device according to one embodiment of the invention.

FIG. 2 illustrates a functional block diagram of proxy server device 208 which may represent proxy server device 108 of FIG. 1. To avoid obscuring the principle aspects of the present invention, well-known methods, procedures, components and circuitry in proxy server device are not described in detail. Further, it is understood to those skilled in the art that a server device used herein pertains to a piece of hardware equipment that comprises one or more microprocessors, working memory, buses and interfaces and other components. On the other hand, a server module herein means processes (i.e., software) used within the server device to perform designated functions through the parts and components in the server device.

Referring to FIG. 2, proxy server device 208 comprises a Landnet Control Protocol (LCP) interface 252 that couples to LANDNET 256 (e.g., LANDNET 116 of FIG. 1), a Wireless Control Protocol (WCP) 212 that couples to AIRNET 204 (e.g., AIRNET 104 of FIG. 1) via a carrier's infrastructure (not shown), a server module 216 coupled between LCP interface 252 and WCP interface 212, a processor (or processors) 244, and storage capability 248.

According to one embodiment of the invention, several applications have been incorporated in server module 216 to provide for the integration and management of account information, location information, and privacy agreements. These functional modules include an account interface 232, an account manager 236, a location manager 224, and a privacy manager 228.

Account manager 236 and account interface 232 manage a plurality of user accounts for all the wireless client devices serviced by proxy server device 208. It is understood that the user accounts may be stored in another network server coupled through LANDNET 256. In other words, the user accounts can be kept in a database that is accessible by any computing devices (e.g., server device) coupled to LAND-NET 256 and can be collected or fetched therefrom. The user accounts may contain information in excess of that which is required to manage the user account. For example, in addition to a device identifier (e.g., 93845823) and a subscriber ID (e.g., 861234567-10900_pn.mobile.xyz.net) the account information may also contain user information (e.g., credit-related information, demographic information and personal data). This information is often private (or sensitive) and thus is registered with the privacy manager 228 for purposes of controlling its release to third parties.

Location manager 224 receives Handset Location Objects (HLOs) from wireless client devices, and receives Network Location Objects (NLOs) from the wireless networks supporting wireless client devices. This information is subjected to a reconciliation process whereby the location manager 224 compares the two location objects and renders an Absolute Location Object (ALO) which represents its best guess as to the actual location of the wireless client device. Additionally, the Absolute Location Object (ALO) may be translated to a particular format (e.g., latitude & longitude, map coordinates, address) requested by a server device desiring location information on a particular wireless client device. Privacy manager 228 manages preexisting privacy agreements and acts as a negotiating agent in establishing new privacy agreements between wireless client devices and server devices. In its capacity as negotiating agent, privacy manager 228 may generate user interfaces for the participants (e.g., an HDML user interface for the wireless client devices) which define the information covered by the agreement, the term of the agreement (e.g., expiration date/time) and how that information may be used. Once a privacy agreement has been established between server devices and proxy server device 208, the requested private data can be supplied to the requesting server device in accordance with the terms and conditions of the privacy agreement. For purposes of optimizing the process, the wireless client device and proxy server device 208 can establish a standing agreement, which pre-establishes terms and conditions for the release of location and related information.

Figure 3:
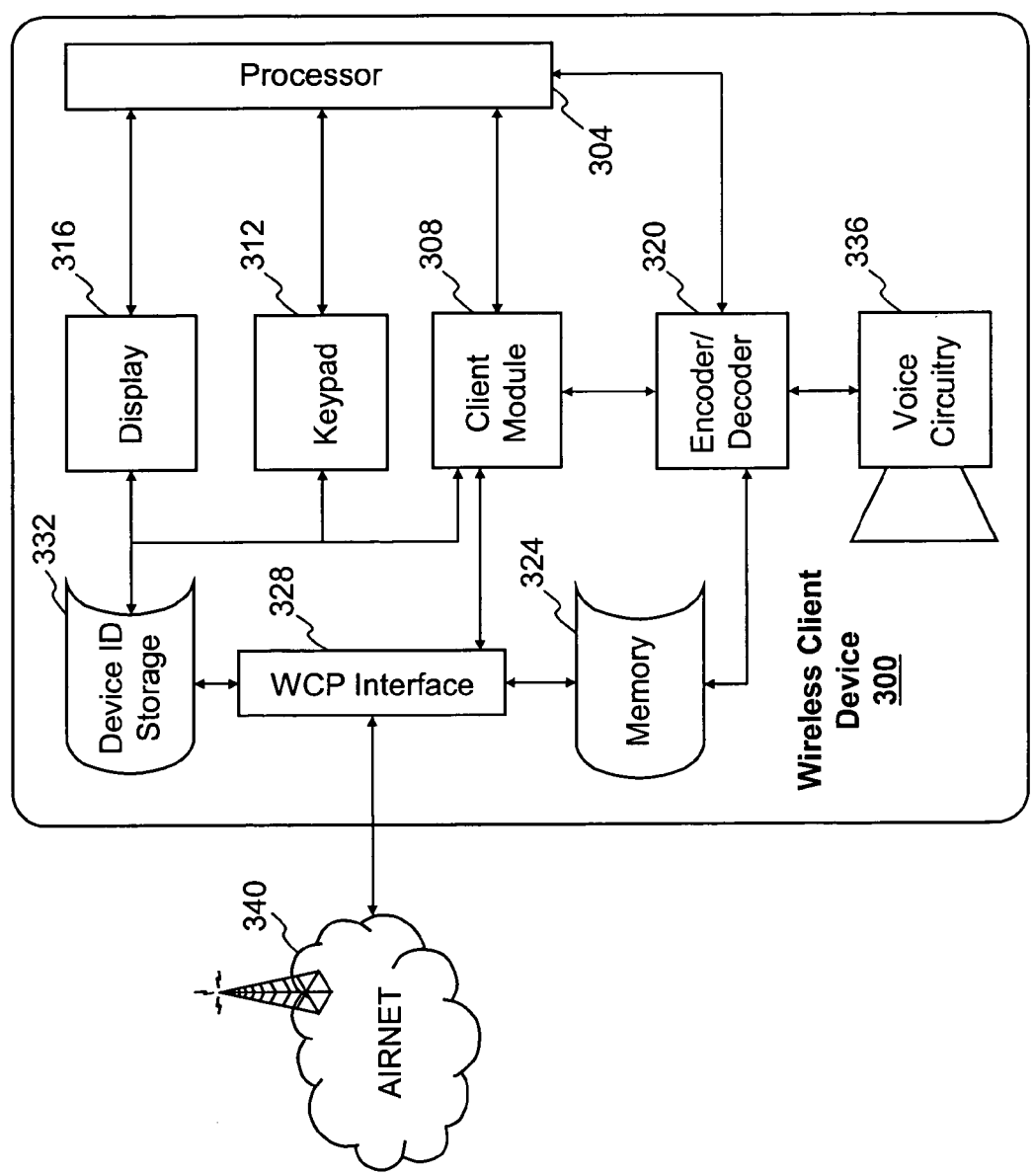
FIG. 3 is a block diagram of a wireless client device according to one embodiment of the invention.

Each of the wireless client devices, such as wireless client device 300 shown in FIG. 3, is assigned a device identifier (ID). A device ID may be a phone number of the device or a combination of an Internet Protocol (IP) address and a port number, for example: 204.163.165.132:01905 where 204.163.165.132 is the IP address and 01905 is the port number. The device ID is further associated with a subscriber ID authorized by a carrier and stored in the associated proxy server device during activation of a subscriber account for wireless client device 300. The subscriber ID may take the form of, for example, "861234567-10900_pn. mobile.att.net" for AT&T Wireless Service, but it is nevertheless a unique identification to wireless client device 300. In other words, each of wireless client devices serviced by a proxy server device has a unique device ID that corresponds to a respective user account also stored in proxy server device. Additionally, this unique identifier may be used to store user specific information, namely, private information (e.g., credit information, demographic information, location information, and other personal data). Alternatively, the access could be anonymous access yet still utilize location information.

FIG. 3 shows a wireless client device 300 according to one embodiment which includes a Wireless Control Protocol (WCP) interface 328 that couples to a carrier network via a AIRNET 340 to receive incoming and outgoing data signals. Device identifier (ID) storage 332 stores and supplies a device ID to WCP interface 328. The device ID identifies a specific code that is associated with wireless client device 300 and directly corresponds to the device ID in the user account typically provided in proxy server device (not shown). In addition, wireless client device 300 includes a client module 308, a processor 304 and a memory 324 that together control the overall operation of wireless client device 300. Client module 308 performs many of the processing tasks performed by wireless client device 300 including: establishing a communication session with a proxy server device via AIRNET 340, requesting and receiving data from the carrier network, displaying information on a display screen 316 thereof, and receiving user input from keypad 312. The client module 308 is coupled to WCP interface 328 for the establishment of a communication session and the requesting and receiving of data. Additionally, the client module 308 operates, among other things, a browser, commonly referred to as micro-browser, which requires much less computing power and memory than do the well-known HTML browsers. The micro-browser is, preferably, a Handheld Device Markup Language (HDML) micro-browser from Phone.com, Inc. located at 800 Chesapeake Drive, Redwood City, Calif. 94063. Additional details on accessing a (proxy) server device from a mobile device including a (micro) browser are described in U.S. Pat. No. 5,809,415, which is hereby incorporated by reference. Wireless client device 300 may further include voice circuitry 336 (e.g., a speaker and a microphone and an encoder/decoder 320 that enable (together with other components) the wireless client device 300 to support a telephone mode of operation as well as a network (data) mode of operation.

Prior to describing the invention in further detail, an illustrative example of an accepted privacy agreement is provided in accordance with the principles of this invention. This example is for purposes of illustration only and is not intended to limit the invention to the particular application or feature described. The markup language used for the following example is Extensible Markup Language (XML). This markup language is presented for purposes of illustration and not limitation. One skilled in the art will appreciate that the present invention can be practiced using other markup languages (e.g., Compact Hypertext Markup Language (cHTML), Hypertext Markup Language (HTML), Wireless Markup Language (WML), and Handheld Device Markup Language (HDML)). A representative accepted proposal for a privacy agreement is as follows:

```
<?xml:namespace ns="http//www.w3.org/TR/1998/WD-P3P10-
syntax#proposal.DTD" prefix="p3p"?>
<?xml:namespace ns="http://www.w3.org/TR/WD-rdf-syntax#"
prefix="RDF"?>
<RDF:RDF><PROP realm="http://www.towing.com/roadservice/"
```

-continued

```
entity="Towing" agreeID="94df1293a3e519bb"
assurance="http://www.TrustUs.org">
<USES>
<STATEMENT purp="2,3" recpnt="0" id="0"
consq="quick towing service">
<WITH><PREFIX name="User.">
<REF name="Last Name"/>
<REF name="First Name" optional="1"/>
<REF name="Location"/>
</PREFIX></WITH>
</STATEMENT>
</USES>
<USES>
<STATEMENT action="read&write" purp="0" recpnt="0" id="1">
<REF name="Sending a Tow Truck"/>
</STATEMENT>
</USES>
<DISCLOSURE discURI="http://
www.towing.com/PrivacyPractice.html" access="3"
ther="0,1"/>
</PROP></RDF:RDF>
```

The representative accepted proposal is in accordance with the Personal Privacy Preferences (P3P) architecture. The definitions of the principle components of the proposal of the privacy agreement are described below:

<PROP>
    includes one or more statements. Each statement includes a set of disclosures as applied to a set of data elements.
  agreeId
    the agreementID (fingerprint of an accepted proposal)
  final
    signals the eventual conclusion of the negotiation
  propURi
    URI at which a proposal may be fetched
  postURI
    URI which information may be transmitted to
  realm
    the list of URIs to which the proposal applies.
  entity
    a text field used to describe the legal entity providing the service and entering into the agreement with the user agent.
  assurance
    a service that attests that the entity will abide by its proposal, follows guidelines in the processing of data, or other relevant assertions.
  agrexp
    the date on which an agreement, if reached, will expire. Default is 6 months. The agreement expiration is the last date when a user agent can transfer data to the service under the agreement. The service continues to be bound by the restrictions of the agreement for data collected under the agreement, even after the expiration. Proposals expire after the time indicated by the "EXPIRES" HTTP header. The default expiration is 1 hour.
  optional
    indicates whether or not the proposal is optional.

Figure 4:
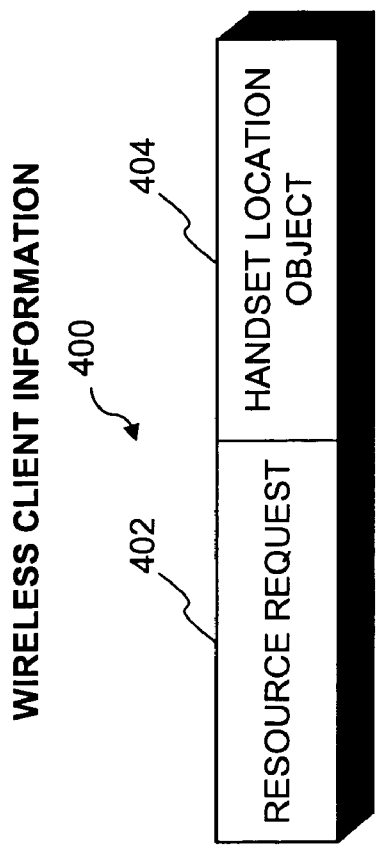
FIG. 4 illustrates a representative wireless client device request according to one embodiment of the invention.

FIG. 4 illustrates a representative wireless client device request 400. Wireless client device request 400 may contain a resource request 402 and a handset location object (HLO) 404. The resource request 402, for example, contains an address (e.g., Uniform Resource Indicator (URI)).

Figure 5:
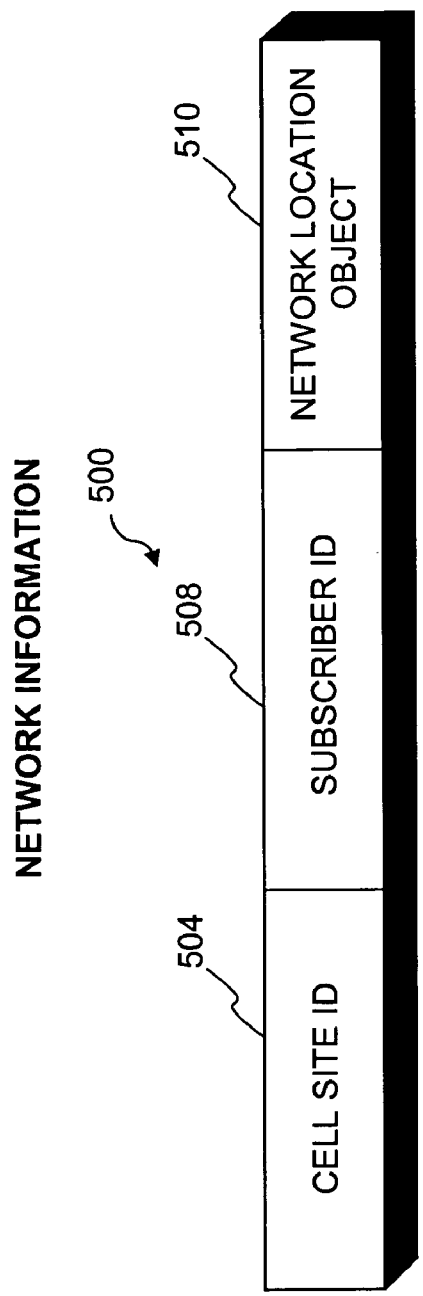
FIG. 5 illustrates network information that may be provided to a proxy server device by wireless network according to one embodiment of the invention.

FIG. 5 illustrates network information 500 that may be provided to a proxy server device by wireless network. Network information 500 may contain cell site identification 504, subscriber identification 508, and a network location object (NLO) 510.

Figure 6:
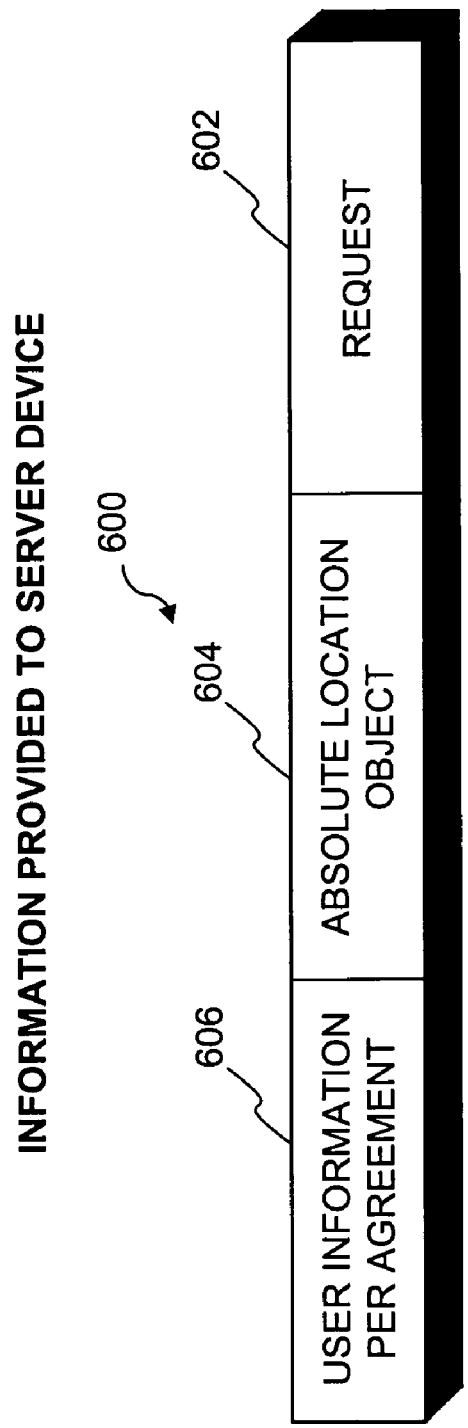
FIG. 6 illustrates information provided to the server device in response to a request for information according to one embodiment of the invention.

FIG. 6 illustrates information 600 provided to the server device in response to a request for information. The information 600 provided to the server device 600 in this example includes the request 602 for information (by wireless client device), absolute location object 604, and other private information 608 as per an existing privacy agreement.

Figure 7:
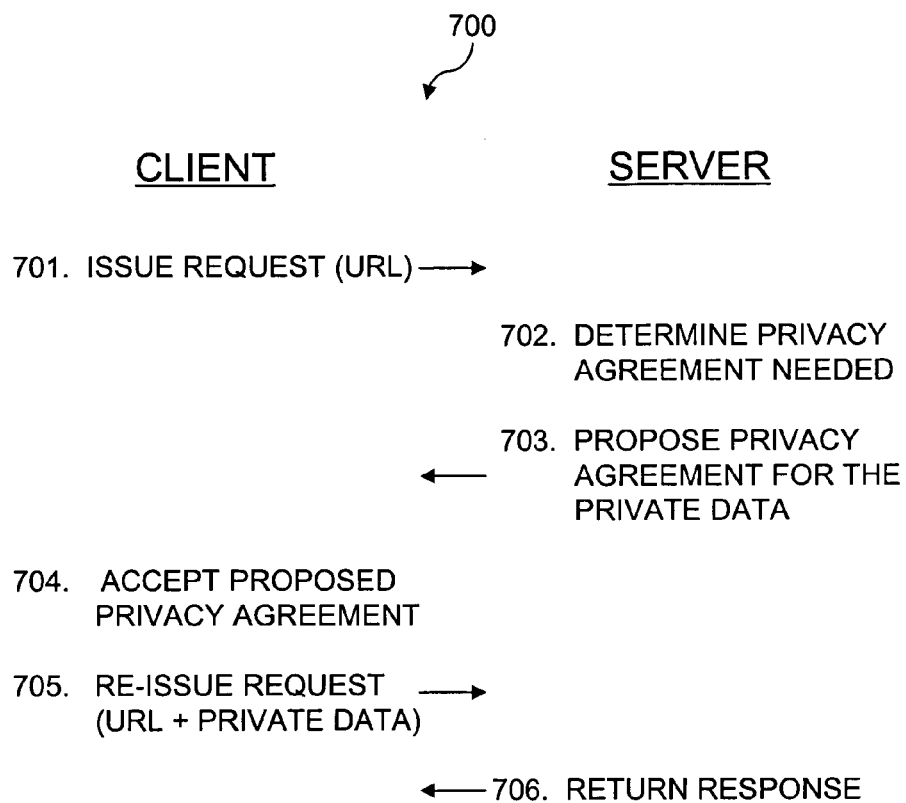
FIG. 7 is a process diagram that represents a private information exchange sequence according to one embodiment of the invention.

FIG. 7 is a process diagram 700 that represents a private information exchange sequence according to one embodiment of the invention. The private information exchange sequence is between a client and a server. In one implementation, the client is a wireless client device and the server is a content server.

The private information exchange sequence initially begins with the client issuing a request (701). The request is for a particular URL. The server receives the request issued by the client and then determines whether a privacy agreement is needed for access to the requested URL (702). As an example, the server can require a privacy agreement to allow access to certain URLs. For example, the server can require a privacy agreement when the requested URL requires use of the client device's private data (e.g., location) in order to process the requested URL. When the server does determine that a privacy agreement is needed, the server returns to the client a proposed privacy agreement for the private data (703). In other words, the initial request is denied and the response returned is the proposed privacy agreement. The client can then accept the proposed privacy agreement or continue to negotiate the terms of the privacy agreement. In any case, after the privacy agreement has been agreed to (704), the client re-issues the request for the particular URL (705). Here, the re-issued request includes not only the particular URL but also the private data pertaining to the client device. In one implementation, the private data is attached to the URL and forms part of the request. In an alternative implementation, the private data can be provided as meta-data for the request. In response to the re-issued request, the server will process the request to retrieve the information associated with the particular URL while using the private data in processing the request. A response is then returned from the server to the client (706), thus completing the request for information.

Figure 8:
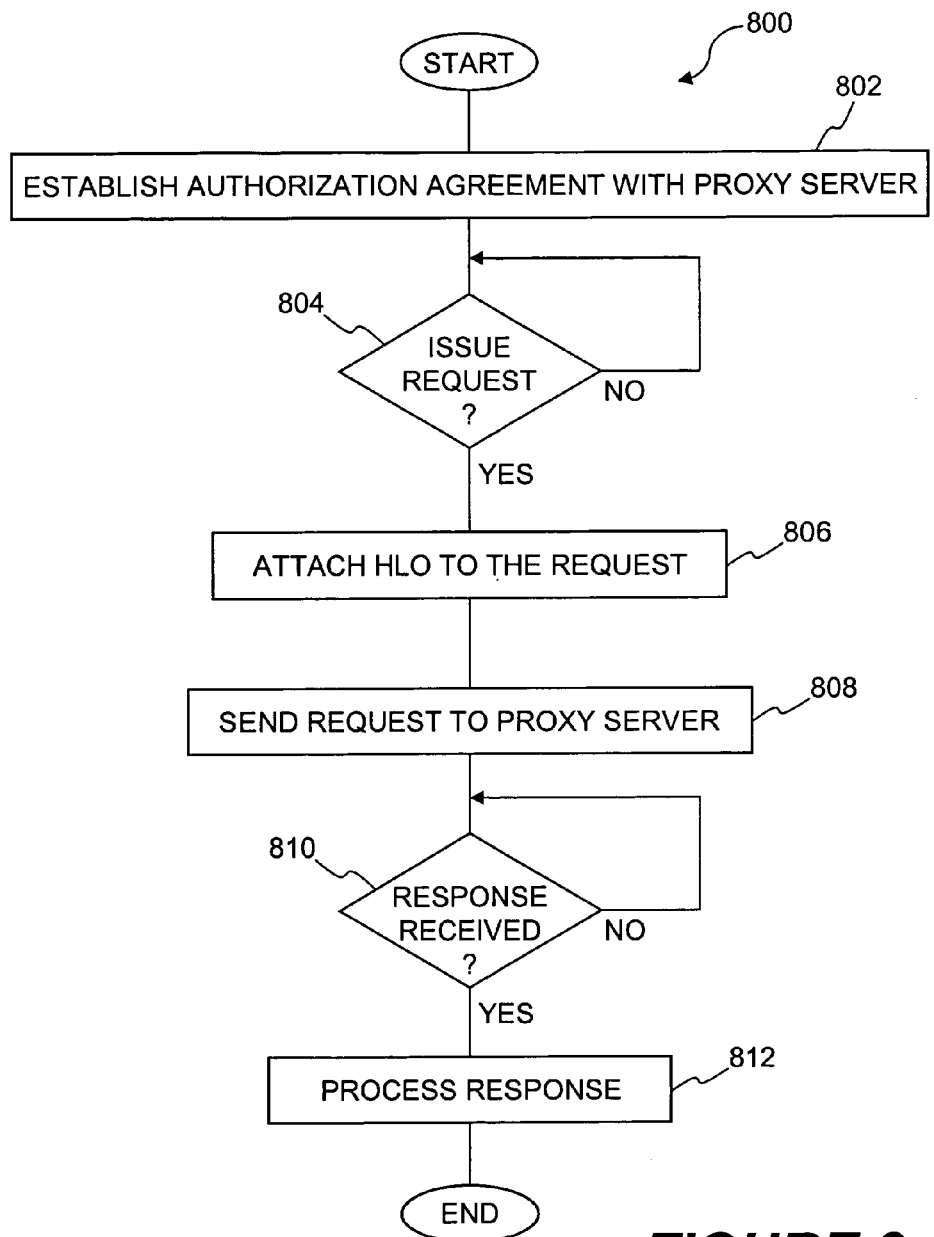
FIG. 8 is a flow diagram of client-side location reporting according to one embodiment of the invention.
Figure 9A:
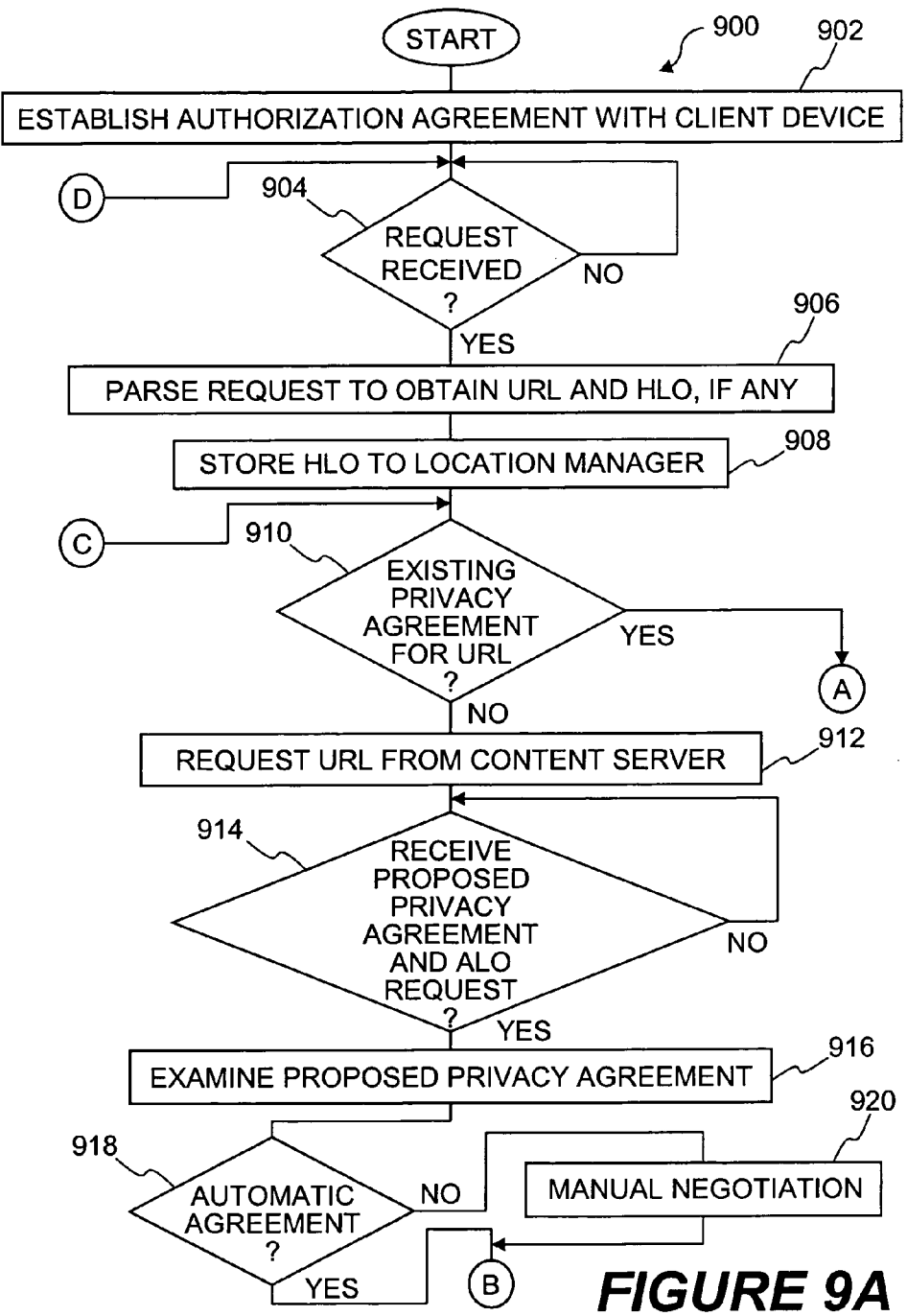
FIGS. 9A–9C are flow diagrams of proxy location processing according to one embodiment of the invention.
Figure 9B:
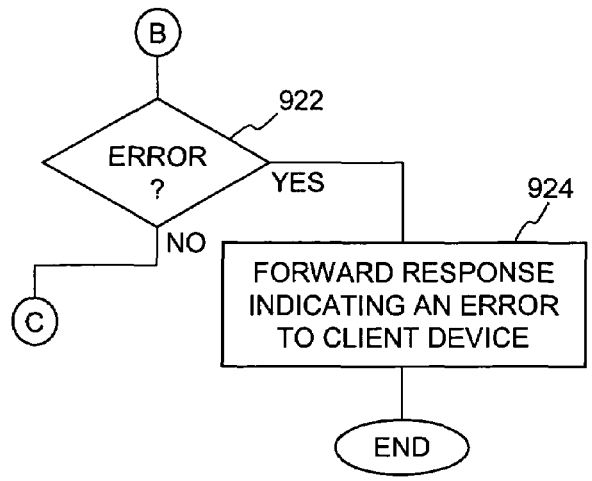
Figure 9C:
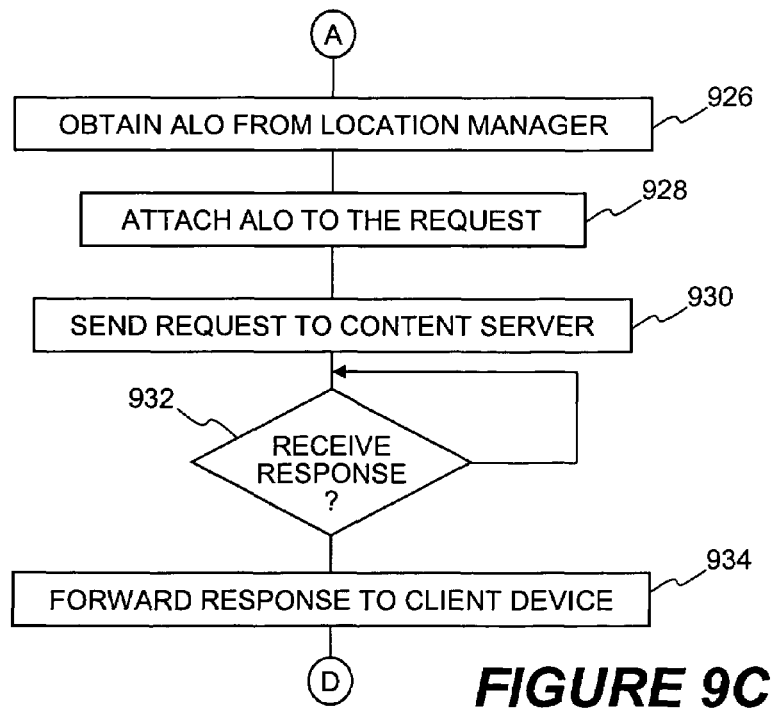
Figure 10:
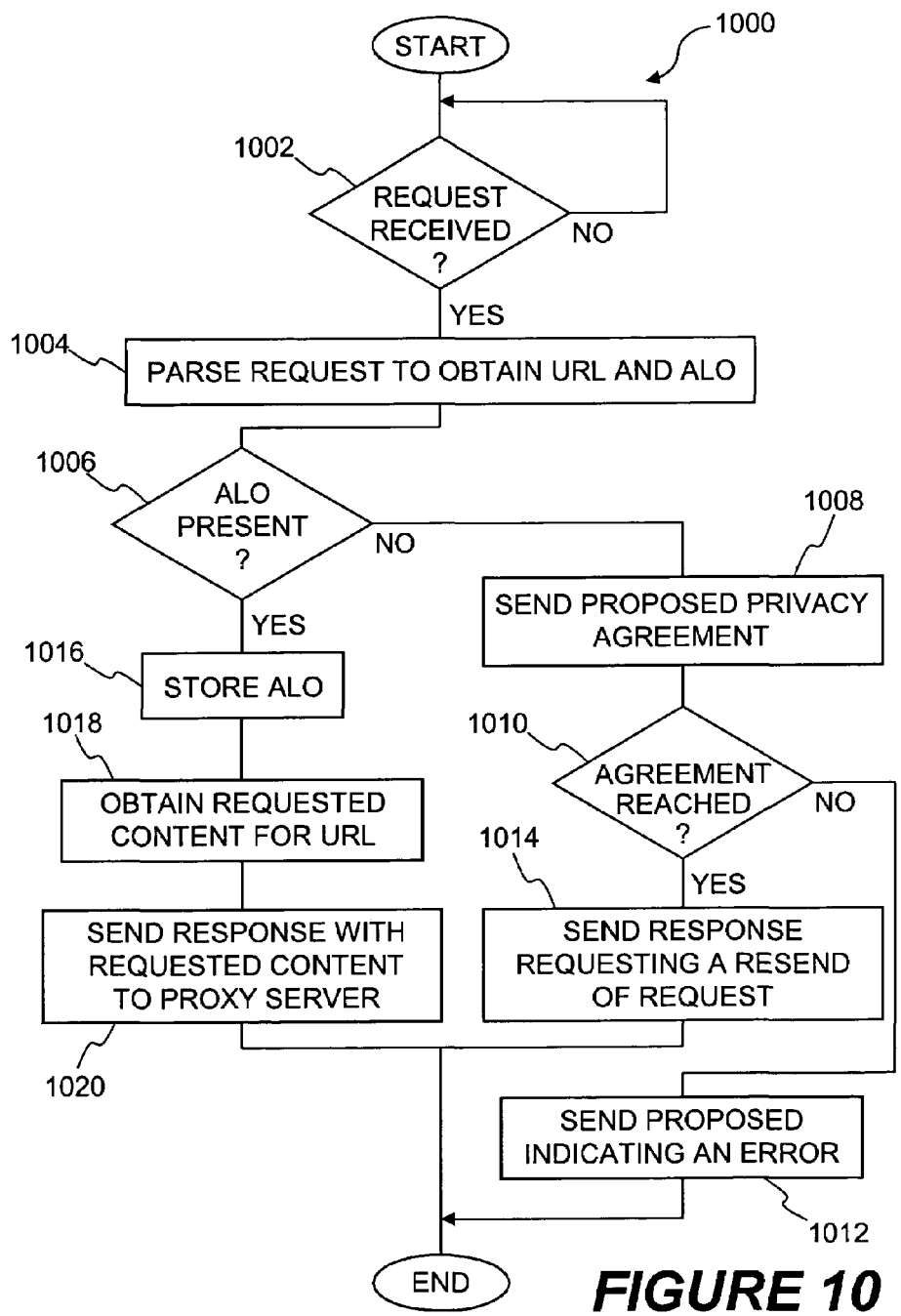
FIG. 10 is a flow diagram of server-side location processing according to one embodiment of the invention.

FIGS. 8–10 are flow diagrams of representative request and response processing in which private information is exchanged in a controlled manner. FIG. 8 pertains to client-side operations, FIGS. 9A–9C pertain to proxy server operations, and FIG. 10 pertains to content server operations.

FIG. 8 is a flow diagram of client-side location reporting 800 according to one embodiment of the invention. The client-side location reporting 800 is performed by a client device. The client-side location reporting 800 initially establishes 802 an authorization agreement with a proxy server. The authorization agreement with the proxy server allows the proxy server to negotiate privacy agreements with content servers on behalf of the client device. A decision 804 then determines whether a request is to be issued. When the decision 804 determines that a request is to be issued, a HLO is attached 806 to the request. Here, the request typically includes at least a URL which designates the resource being requested and the HLO is attached to the request. More generally, private information (e.g., HLO) is attached to the request. The request is then sent 808 through the proxy server.

A decision 810 determines whether a response has been received. Here, the client-side location reporting 800 is awaiting a response from the content server via the proxy device. Once the decision 810 determines that a response has been received, the response is processed 812. After the response is processed 812, the client-side location reporting 800 is complete and ends because the issued request has been satisfied.

FIGS. 9A–9C are flow diagrams of proxy location processing 900 according to one embodiment of the invention. The proxy location processing 900 is, for example, performed by a proxy server.

The proxy location processing 900 initially establishes 902 an authorization agreement with the client device. Here, the proxy server interacts with the client device to establish an authorization agreement which authorizes the proxy server to negotiate privacy agreements for the client device with respect to content servers. A decision 904 then determines whether a request has been received. Here, the proxy server awaits receipt of requests from client devices. When the decision 904 determines that a request has been received, the request is parsed 906 to obtain the particular URL associated with the request and a HLO (or other sensitive information). In some situations, the request will not include the HLO as it could be sent periodically or after it has changed to reduce overhead traffic. However, when the HLO is provided, it is parsed 906 from the request and then stored 908 to a location manager. The location manager is provided within the proxy server to manage the location of the client devices serviced by the proxy server (see FIG. 2, location manager 224).

A decision 910 then determines whether an existing privacy agreement exists for the particular URL. The decision 910 could also determine whether or not a privacy agreement is even needed for the particular URL. In any case, when the decision 910 determines that there is no existing privacy agreement in place for the particular URL, then the particular URL is requested 912 from the content server without any sensitive information. Although the URL has been requested, the content server will not service the request because there is no existing privacy agreement for the particular URL. Hence, the content server will return a proposed privacy agreement as well as a ALO request (or sensitive information request). Thus, a decision 914 determines whether the proposed privacy agreement and the ALO request have been received. When the decision 914 determines that the proposed privacy agreement and the ALO have not yet been received, the decision 914 causes the proxy location processing 900 to await their receipt. Once the proposed privacy agreement and the ALO request have been received, the proposed privacy agreement is examined 916. Upon being examined, the proxy server can determine at decision 918 whether it can automatically agree to the proposed privacy agreement on behalf of the client device. When the decision 918 determines that it cannot automatically agree to the proposed privacy agreement, manual negotiation 920 is performed between the client device, the proxy server, and the content server so that a privacy agreement can be reached. Alternatively, when the decision 918 determines that an automatic agreement can be made, the manual negotiation 920 is bypassed.

At this point, whether by automatic agreement or manual negotiation, a privacy agreement has been accepted or an error has occurred. The error can be that an agreement could not be reached and thus the request fails. Here, a decision 922 can determine whether an error is returned by the content server. When an error is returned, then the proxy server forwards 924 a response indicating an error to the client device. Alternatively, when the decision 922 determines that an error is not returned (and thus an agreement was reached), the proxy location processing 900 returns to block 910 so that the request can be satisfied now that a privacy agreement has been agreed upon.

Once the decision 910 determines that there is a privacy agreement for the URL, additional processing is then carried out by the proxy location processing 900 to provide location information to the content server and obtain a response for the client device. Specifically, after a privacy agreement is put in place, the proxy server obtains 926 the ALO from the location manager. The ALO represents the location manager's best estimate for the client device upon taking into consideration the HLO and the NLO. Then, the ALO is attached 928 to the request. The request is then sent 930 to the content server. A decision 932 then determines whether a response has been received from the content server. When the decision 932 determines that a response has not yet been received, the proxy location processing 900 awaits such a response. Once the decision 932 determines that a response has been received, the response is forwarded 934 to the client device. After the response has been forwarded 934, the proxy location processing 900 is complete and returns to block 904 to process another request.

FIG. 10 is a flow diagram of server-side location processing 1000 according to one embodiment of the invention. The server-side location processing 1000 is, for example, performed by a content server.

The server-side location processing 1000 begins with a decision 1002 that determines whether a request has been received. In other words, the server-side location processing 1000 is initiated or activated when a URL is requested. After a request has been received, the request is parsed 1004 to obtain the URL and, if present, the ALO. A decision 1006 then determines whether the ALO is present. When the decision 1006 determines that the AlO is not present, the content server sends 1008 a proposed privacy agreement to the proxy server. The proposed privacy agreement is a proposed agreement in which the content server specifies how private data is to be used by the content server. Next, a decision 1010 determines whether an agreement has been reached between the content server and either the client device or proxy server. When the decision 1010 determines that an agreement has not yet been reached, the content server sends 1014 a response to the proxy server indicating an error (e.g., error because no agreement was able to be reached). On the other hand, if the decision 1010 determines that an agreement has been reached, the content server sends 1014 a response to the proxy server requesting a re-send of the request. Following either block 1012 or 1014, the server-side location processing 1000 is complete and ends for the particular request.

On the other hand, when the decision 1006 determines that the AlO is present, the ALO is stored 1016. When the content server receives an ALO with a request, it indicates that a privacy agreement is in place. The requested content associated with the URL is then obtained 1018. The requested content might differ depending on the ALO provided with the request. Next, a response with the requested content is sent 1020 to the proxy server. In other words, after a privacy agreement has been reached between the content server and the client device or proxy server, a request for content from the content server can be received and carried out in accordance with the terms of the privacy agreement. After the response has been sent 1020, the server-side location processing 1000 is complete and ends.

The proxy server can establish privacy agreements with content servers (service providers) in at least two ways. A first way is through configuration in which a carrier can manage a list of realms (e.g., URLs) that are allowed location reporting. Although the realms would typically be stored with the proxy server, if space for storage were available on the client device to store the realms, the location information could be sent only when actually needed by outstanding privacy agreements. The second way is through negotiation in which the proxy server acts as a proxy for agreement negotiation. In one implementation, the agreement negotiation can be in accordance with P3P. The negotiation can be simple or complicated depending upon the implementation.

After an agreement is in place, the location data can be sent as meta-data within the headers of the request. If the client device, namely, the browser operating in the client device, knows its location (i.e., HLO), the client device can send its location to the proxy server with each request. However, to optimize use of data transmission, the client device (or browser) can send the HLO only when it changes. For example, if the client device only knows that the cell ID in the wireless network has changed, then it could report as it moves between cells. Alternatively, the proxy server (or other Position Determining Equipment (PDE) in the network) can ask the client device for its location (e.g., out-of-band location). As another example, in the case of latitude/longitude information, the server could tune for overhead improvement by negotiating the granularity of location that it cares about. For example, if the server says only ask for a one mile radius, the mobile station would only report a new location after it had moved more than a mile. Also, if the proxy server knows the location of the client device (ALO) and the requested URL is in one of the realms of an existing agreement, the proxy server can proceed to attach the location to the request. Also note that in some situations, the privacy agreement could preclude (or control) attachment of other type of data to the request (e.g., subscriber identifier or other related information).

When the proxy server decides to attach location data to a request, the following procedures can be performed. First, if the wireless network provides location data, the proxy server requests the client device's location from the network (i.e., NLO) . . . Thereafter, the HLO and NLO are reconciled to present the "location", namely the ALO. The "location" can also be influenced based on granularity and accuracy.

In addition, passive location reporting can be performed. In a simple implementation, a command may be sent to the client device to cause it to invoke a URI with its current location. Alternatively, the client device (browser) and proxy server could include a status reporting mechanism in which, whenever the location changes more than the granularity, the browser reports the location change to the proxy server by invoking a predetermined URI. The proxy server could include a list of application URIs to invoke for status changes. Hence, the status change could be initiated by the proxy server, either by the browsers invocation of the special predetermined URI or by signal from the network that the client device has moved.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that subscribers to networks (e.g., wireless networks) can control the release of their information over the networks. Another advantage of the invention is that client devices (subscribers) of networks can control the release of their information with respect to server devices on the networks. Still another advantage of the invention is that a proxy server can negotiate privacy agreements on behalf of client devices. Yet another advantage of the invention is that a proxy server can transform various location data formats without exposing confidential network topology information.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for controlling exchange of private information associated with a client device, wherein the client device is a wireless device, said method comprising:
   (a) receiving a request from the client device;
   (b) determining whether a privacy agreement is needed to respond to the request before private information associated with said client device is exchanged;
   (c1) determining whether a privacy agreement can be reached before private information associate with said client device is exchanged when said determining (b) determines that said privacy agreement is needed, wherein the private agreement includes a plurality of components and governs the exchange of the private information, and wherein said determining of whether said privacy agreement can be reached comprises:
   (c2) determining whether to accept at least one proposed privacy agreement by examining said at least one proposed privacy agreement, wherein said at least one proposed privacy agreement includes a plurality of components that govern the exchange of the private information associated with said client
   (c3) negotiating at least one component of said at least one proposed privacy agreement when said determining (c2) determines not to accept said proposed privacy agreement;
   (c4) generating an accepted privacy agreement as a set of rules that govern the exchange of private information when said determining (c2) determines to accept said privacy agreement; and
   (d) thereafter producing a response to the request when said determining (c2) determines to accept said privacy agreement.

2. A computer-implemented method as recited in claim 1, wherein the private information includes location information of the client device.

3. A computer-implemented method as recited in claim 1, wherein said producing (d) comprises:
   (d1) receiving the private information associated with the client device; and
   (d2) producing the response to the request based at least in part on the private information.

4. A computer-implemented method as recited in claim 3, wherein the private information includes location information of the client device.

5. A computer-implemented method as recited in claim 4, wherein the client device is associated with a network, and
wherein the location information is at least one of client-provided and network-provided.

6. A computer-implemented method as recited in claim 3, wherein said method is performed on a server.

7. A computer-implemented method as recited in claim 6, wherein the private information is attached to the request.

8. A computer-implemented method as recited in claim 1, wherein said accepted privacy agreement includes the following principle components-a PROP, an agreeID, a final, a propURI, a postURL, a realm, an entity, an assurance, an agrexp, and an optional principal component.

9. A computer-implemented method as recited in claim 1,
wherein said privacy agreement is negotiated in accordance with a Platform for Privacy Preferences (P3P) protocol, and
wherein said accepted privacy agreement includes one or more of the following principle components: a PROP, an agreeID, a final, a propURI, a postURL, a realm, an entity, an assurance, an agrexp, and an optional principal component.

10. A computer-implemented method as recited in claim 1, wherein said method further comprises:
providing an accepted privacy agreement in a markup language.

11. A computer-implemented method as recited in claim 10, wherein said markup language can be XML, HTML, WML, and HDML.

12. A computer-implemented method as recited in claim 1, wherein said method further comprises:
subsequent to said negotiating (c3) determining (c2) whether to accept at least one proposed privacy agreement.

13. A computer-implemented method for exchanging private information associated with a client device to a server device via a proxy server, wherein the private information includes location information of the client device, wherein the client device is a wireless device, said method comprising:
establishing an authorization agreement that authorizes the proxy server to negotiate privacy agreements with server devices on behalf of the client device, wherein the privacy agreement defines a set of rules that govern the exchange of information between the client device and the server device;
receiving a request at the proxy server, wherein the request includes the private information associated with the client device and wherein a response to the request can be made by the server device;
receiving a proposed privacy agreement from the server device associated with the request;
negotiating the privacy agreement by the proxy server on behalf of the client device when the proposed privacy agreement is not in accord with the authorization agreement;
accepting, by the proxy server for the client devices, the proposed privacy agreement as a privacy agreement, when the proposed privacy agreement is in accord with the authorization agreement; and
providing the private information to the server device after said accepting of the proposed privacy agreement as the privacy agreement or after said negotiating of the privacy agreement.

14. A computer-implemented method as recited in claim 13, wherein the private information includes location information of the client device.

15. A implemented method as recited in claim 14, wherein the client device is associated with a network, and
wherein the location information is at least one of client-provided and network-provided.

16. A computer-implemented method as recited in claim 13, wherein said providing operates to refuse to provide the private information to the server device when both the proposed privacy agreement is not accepted and negotiating of the privacy agreement is unsuccessful.

17. A computer-implemented method as recited in claim 13, wherein said method further comprises:
determining whether an existing privacy agreement already exists for the server device and the client device; and
bypassing said receiving of the proposed privacy agreement and said accepting of the proposed privacy agreement when said determining operates to determine that an existing privacy agreement already exists for the server device and the client device.

18. A computer-implemented method as recited in claim 17, wherein said determining of an existing privacy agreement already exists comprises:
identifying an existing agreement between the server device and the client device, the existing agreement having a predetermined coverage; and
determining whether the request is covered by the predetermined coverage of the identified existing agreement.

19. A computer-implemented method as recited in claim 14, wherein the request is received at the proxy server and the response is produced by the server device.

20. A computer-implemented method as recited in claim 19, wherein the request includes the private information associated with the client device.

21. A computer implemented method for controlling exchange of private information associated with a client device, wherein the client device is a wireless device supported by a network infrastructure, said method comprising:
(a) receiving a request from the client device, the request being directed to a server device;
(b) determining whether a privacy agreement is needed to respond to the request;
(b1) determining whether a privacy agreement can be reached, when said determining (b) determines that said privacy agreement is needed, wherein said private agreement governs the exchange of the private information, and wherein said determining of whether said privacy agreement can be reached comprises:
determining whether to accept at least one proposed privacy agreement by examining said at least one proposed privacy agreement, wherein said at least one proposed privacy agreement includes a plurality of components which does a set of rules governing the exchange of private information; negotiating at least one component of said at least one proposed private agreement when said determining determines that the privacy agreement should not be accepted;
generating an accepted privacy agreement when said determining determines to accept a privacy agreement, wherein said accepted privacy agreement includes one or more components that define the accepted privacy agreement;
(c) determining, based on said accepted privacy agreement, whether the server device is authorized to receive the private information associated with the client device when said determining (b) determines that a privacy agreement is needed; and (d) providing the private information to the server device associated with the request when said determining (c) determines that the server device is authorized to receive the private information associated with the client device.

22. A computer-implemented method as recited in claim 21, wherein said method further comprises:
(e) thereafter producing a response to the request at the server device.

23. A computer-implemented method as recited in claim 22, wherein said producing (e) comprises:
(e1) receiving the private information associated with the client device; and
(e2) producing the response to the request based at least in part on the private information.

24. A computer-implemented method as recited in claim 23, wherein the private information includes location information of the client device.

25. A computer-implemented method as recited in claim 21, wherein the request includes a URL, and
wherein said determining (c) comprises:
(c1) comparing the URL of the request with a list of authorized URLS; and
(c2) determining that the server device is authorized to receive the private information associated with the client device when said comparing (c1) determines that the URL of the request is found within the list of authorized URLs.

26. A computer-implemented method as recited in claim 21, wherein said method further comprises:
subsequent to said negotiating determining whether to accept at least one proposed privacy agreement.

27. A system for controlling information exchange between a wireless client device and server devices, the wireless client device being supported by a wireless network, said system comprising:
a proxy server device operatively connected between the wireless client device and the server device, wherein said proxy server device manages distribution of private information associated with the wireless client device to the server devices, and wherein said proxy server device includes at least:
a storage area, said storage area stores information received from at least one of the wireless client device and from the wireless network;
a privacy manager, said privacy manager operates to restrict the release of the information received from the wireless client device and the wireless network to the one or more of the server devices unless a suitable privacy agreement governing the use of the information is in place for the one or more server devices; and
wherein said privacy manager is further capable of operating to:
determine whether said privacy agreement is accepted, wherein said privacy agreement can be accepted by examining at least one proposed privacy agreement that includes a plurality of components which govern the exchange of privacy information associated with said client device;
initiate negotiation of at least one component of said at least one proposed privacy agreement when said determining determines that said privacy agreement is not accepted; and
generate an accepted privacy agreement as a set of rules that govern the exchange of private information when said determining determines that said privacy agreement is accepted.

28. A system as recited in claim 27, wherein the information received from at least one of the wireless client device and the wireless network comprises location information associated with the location of the wireless client device.

29. A system as recited in claim 27,
wherein the information received from the wireless client device and the wireless network comprises location information associated with the location of the wireless client device, and
wherein said system further comprises:
a location manager, said location manager performs a reconciliation and/or canonicalization process on the location information received from the wireless client device and the wireless network to produce a determined location.

30. A system as recited in claim 29, wherein said privacy manager operates to restrict the release of the determined location to the one or more of the server devices unless a suitable privacy agreement governing the use of the determined location is in place for the one or more server devices.

31. A system as recited in claim 30, wherein the suitable privacy agreement is provided in a markup language.

32. A system as recited in claim 30, wherein said privacy manager can further negotiate with the one or more server devices to establish a suitable privacy agreement.

33. A system as recited in claim 27, wherein said privacy manager can further negotiate with the one or more server devices to establish a suitable privacy agreement.

34. A system as recited in claim 27, wherein the information received from at least one of the wireless client device and the wireless network comprises subscriber information associated with the subscriber of the wireless client device.

35. A system as recited in claim 27, wherein the information includes private information and non-private information, and
wherein said privacy manager restricts access to the private information but not the non-private information.

36. A computer readable medium including at least computer program code for exchanging private information associated with a client device to a server device via a proxy server, wherein the private information includes location information of the client device, wherein the client device is a wireless device, said computer readable medium comprising:
computer program code for establishing an authorization agreement that authorizes the proxy server to negotiate privacy agreements with sewer devices on behalf of the client device, wherein the privacy agreement defines a set of rules that govern the exchange of information between the client device and the server device;
computer program code for receiving a request at the proxy server, wherein the request includes the private information associated with the client device and wherein a response to the request can be made by the server device;
computer program code for receiving a proposed privacy agreement from the server device associated with the request;
computer program code for initiating negotiation of the privacy agreement by the proxy server on behalf of the client device when the proposed privacy agreement is not in accord with the authorization agreement;

computer program code for accepting, by the proxy server for the client device, the proposed privacy agreement as a privacy agreement, when the proposed privacy agreement is in accord with the authorization agreement; and computer program code for providing the private information to the server device after said accepting of the proposed privacy agreement as the privacy agreement or after said negotiating of the privacy agreement.

37. A computer readable medium including at least computer program code for controlling exchange of private information associated with a client device, wherein the client device is a wireless device, said computer readable medium comprising:

computer program code for receiving a request from the client device;

computer program code for determining whether a privacy agreement is needed to respond to the request before private information associated with said client device is exchanged;

computer program code for determining whether a privacy agreement can be reached before private information associated with said client device is exchanged when said determining determines that said privacy agreement is needed, wherein the privacy agreement includes a plurality of components and governs the exchange of the private information, and wherein said determining of whether said privacy agreement can be reached comprises:

determining whether to accept at least one proposed privacy agreement by examining said at least one proposed privacy agreement, wherein said at least one proposed privacy agreement includes a plurality of components that govern the exchange of the private information associated with said client;

initiating negotiation of at least one component of said at least one proposed privacy agreement when said determining determines not to accept said proposed privacy agreement;

generating an accepted privacy agreement as a set of rules that govern the exchange of private information when said determining determines to accept said privacy agreement, and computer program code for thereafter producing a response to the request when said determining determines to accept said privacy agreement.

* * * * *